UNITED STATES PATENT OFFICE.

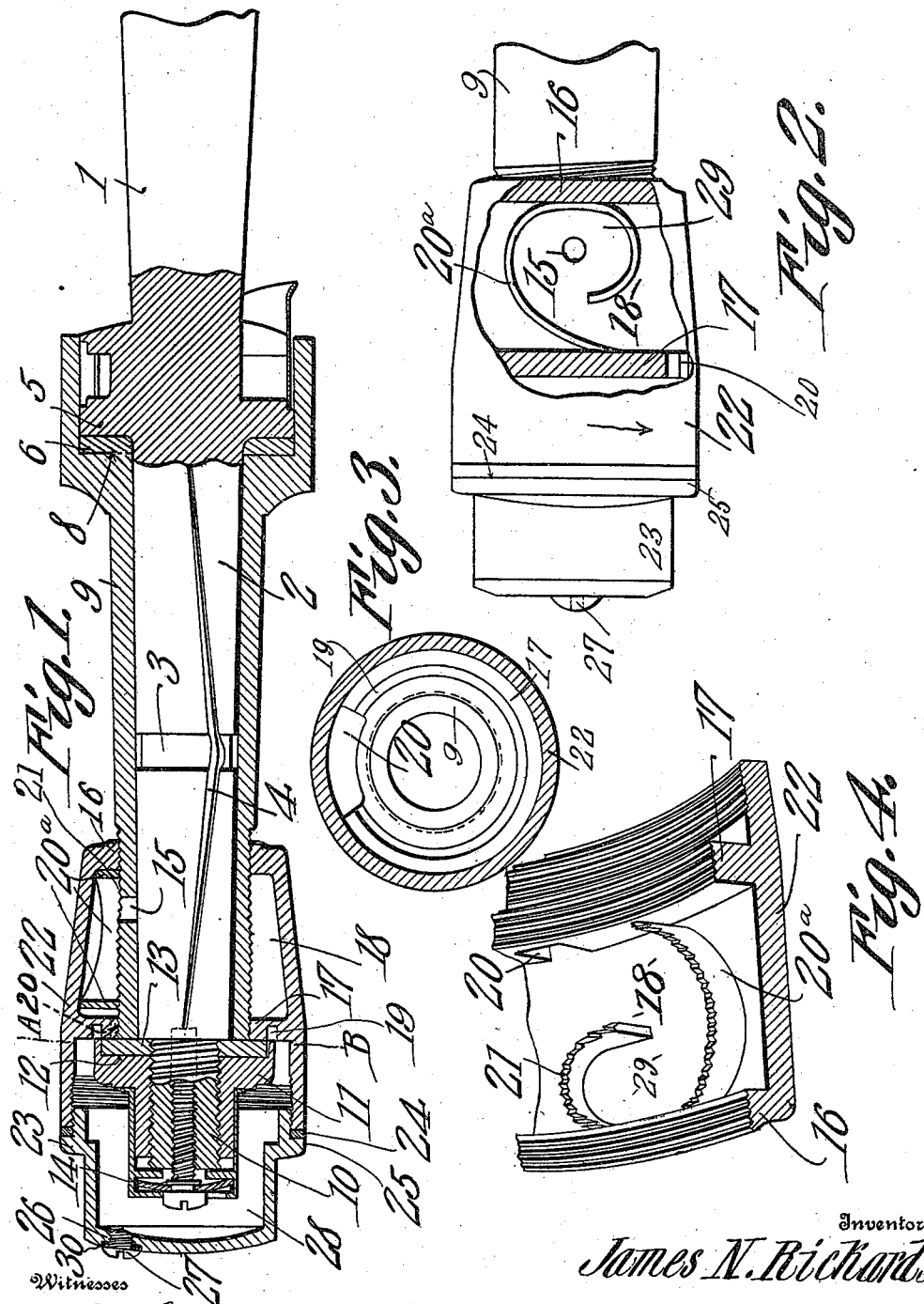

JAMES NELSON RICKARDS, OF RIDGELY, MARYLAND.

AXLE-LUBRICATOR.

984,854.  Specification of Letters Patent.  Patented Feb. 21, 1911.

Application filed October 20, 1909. Serial No. 523,625.

*To all whom it may concern:*

Be it known that I, JAMES N. RICKARDS, a citizen of the United States, residing at Ridgely, in the county of Caroline and State of Maryland, have invented a new and useful Axle-Lubricator, of which the following is a specification.

This invention relates to lubricators for axles and its principal object is to provide means whereby a lubricant can be supplied to the top portion of the axle spindle during each rotation of the hub, there being an oil compartment about the box of the hub which is provided with novel means for directing the oil positively in the direction of an outlet port opening into the bore of the box.

A further object is to provide an oil reservoir the outer portion of which is formed by a removable cap detachably engaging a sleeve which projects into the wheel hub and detachably engages the box therein.

With these and other objects in view the invention consists of certain novel details of construction and combinations of parts hereinafter more fully described and pointed out in the claims.

In the accompanying drawings the preferred form of the invention has been shown.

In said drawings, Figure 1 is a longitudinal section through an axle box having the present improvements applied thereto, a portion of the axle being shown in section. Fig. 2 is a plan view of a portion of the axle box a portion of the wall of the lubricant reservoir being broken away. Fig. 3 is a transverse section through the reservoir, said section being taken on the line A—B, Fig. 1. Fig. 4 is a perspective view of the interior of a portion of the reservoir and showing the deflecting strip.

Referring to the figures by characters of reference 1 designates an axle having a tapered spindle 2 provided at an intermediate point with an annular groove 3, there being downwardly converging channels 4 in the front or advancing portion of the spindle which extend from the end portions of said spindle to the said annular groove 3 so as to collect and properly spread over the spindle all lubricant supplied thereto. The said channels also constitute means for receiving grit or other undesirable particles and allowing them to work downward into the groove 3 and thus prevent them from abrading or otherwise injuring the meeting faces of the spindle and axle box.

An annular shoulder 5 is formed about the axle at the large end of the spindle and has a washer 6 of leather or the like bearing against one face thereof and constituting an abutment for an interior shoulder 8 formed in the counter-bored large end of an axle box 9 this box being provided with a tapered bore designed to receive the spindle 2. A screw threaded stud 10 extends from the center of the small end of the spindle and is engaged by a nut 11 in the inner face of which is formed a circular recess 12 for the reception of a washer 13 of leather or the like, said washer being clamped against the adjoining end of the axle box so as to prevent leakage of lubricant from the interior of the axle box and back to the reservoir hereinafter described. This nut 11 may be provided with a suitable lock such as shown generally at 14 in Fig. 1. This lock however does not constitute any part of the present invention.

The axle box 9 is exteriorly screw threaded at the outer or small end thereof and has a port 15 formed in the wall thereof. This threaded portion of the axle box is engaged by inwardly directed flanges 16 and 17, the flange 16 being located at one end of a sleeve 22 while the flange 17 is arranged at an intermediate point, there being an annular compartment thus formed within the sleeve and between the two flanges. This compartment has been indicated at 18. The outer face of the flange 17 is contacted by the washer 13 and has a circular groove 19 into which the annular wall of recess 12 may be forced when the nut 11 is adjusted to take up wear upon the washer 13. A port 20 is formed in the flange 17 and arranged within the compartment 18 is a deflecting strip 20ª which extends across the compartment 18 along a curved line to form a volute partition, as clearly indicated in Figs. 2 and 4.

That edge of the strip which lies close to the axle box 9 is toothed, as shown at 21 so as to properly engage the threads on the axle box. It will be seen that the volute partition 20ª constitutes means for properly deflecting a lubricant into the port 15 in the manner hereinafter set forth.

The outer end of the sleeve 22 extends around and is spaced from the nut 11 and is interiorly screw-threaded, the said threads being engaged by corresponding threads formed upon a hollow screw cap 23 which extends around the nut 11 and across the end thereof, there being a packing ring or washer 24 interposed between the sleeve 22 and an annular flange 25 formed on the cap. An inlet opening 26 is formed in the cap and is normally closed by a screw plug 27.

The compartment 28 formed within the cap 23 and the outer portion of the sleeve 22 is designed to be filled with a lubricant which is admitted thereto through the opening 26 after which said opening is closed by the plug 27. As the wheel rotates in the direction of the arrow shown in Fig. 2, the port 20 in partition or flange 17 is brought into position below the level of the lubricant and a portion of said lubricant will thus flow through the port and into the compartment 18. During the upward movement of the curved deflecting strip or partition 20ª, which occurs during the second half of the rotation of the wheel the lubricant is dashed against said strip 20ª, and deflected into the pocket 29 formed between the oppositely curved portions of the strip and is thus held for a short period until a portion of the lubricant has passed through the port 15 and into contact with the spindle 2. As heretofore pointed out, during the rotation of the axle box, the lubricant will be collected and distributed by the inclined downwardly converging channels 4.

Importance is attached to the fact that the lubricator herein described can be readily applied to any ordinary axle box, it merely being necessary to screw thread the axle box at the outer end thereof and to drill the port 15 thereinto. A sleeve 22 can then be screwed onto the axle box and the nut 11 placed on the stud 10 so as to hold the parts properly assembled. The structure shown forms a perfectly oil tight chamber without the necessity of cutting away any of the wearing surface of the box or spindle. The lubricant is supplied automatically to the spindle as the wheel revolves and the construction of the entire apparatus is such as to strengthen the hub structure. It is not necessary to remove the wheel in order to fill the lubricator as all necessary lubricant can be readily supplied through the opening 26. It is also to be understood that if desired, a washer 30 formed of leather or the like may be placed around the opening 26 in the cap and between said cap and the head of the screw plug so as to prevent leakage of lubricant at this point.

What is claimed is:—

1. The combination with an exteriorly screw-threaded axle box having a port opening thereinto, of a sleeve removably mounted upon the box and having inwardly directed flanges engaging the threaded portion of the box and forming a compartment there-between, there being means for admitting a lubricant into said compartment intermittently during the rotation of the axle box, and deflecting means within the compartment and adjacent the port.

2. The combination with an axle box having a port, of a sleeve detachably engaging said box and having a compartment therein communicating with the port, a cap detachably engaging the sleeve and extending across one end of the box, said cap and sleeve coöperating to form a reservoir, there being means for intermittently admitting a lubricant from the reservoir to the compartment during the rotation of the box, and means within the compartment for deflecting the lubricant toward the port.

3. The combination with an axle box having a port, of a sleeve detachably engaging the box and having an annular compartment opening into the port, a cap detachably engaging the sleeve and extending across the end of the box, said cap and sleeve coöperating to form a reservoir, there being means for intermittently admitting a lubricant from the reservoir into the compartment during the rotation of the box and oppositely curved deflecting means within the compartment and forming a pocket for directing the lubricant into the port.

4. The combination with a spindle, of an axle box mounted for rotation thereon and having a port for directing a lubricant onto the spindle a sleeve detachably engaging the box and having an annular compartment opening into the port, a cap detachably engaging the sleeve, said cap and sleeve coöperating to form a reservoir, there being a normally closed inlet opening in the cap, means located within the reservoir and detachably engaging the spindle, for holding the spindle and box against relative longitudinal movement, there being means for intermittently admitting lubricant from the reservoir into the compartment during the rotation of the box, and deflecting means within the compartment for directing the lubricant into the port.

5. A lubricator attachment for axle boxes, consisting of a sleeve having inwardly directed screw threaded flanges, a cap detachably engaging one end of the sleeve, there being a port within the flange adjoining the cap and curved deflecting means within the sleeve and between the flanges, said means being notched, the notches, and the threads upon the flanges being adapted for engagement with the threads upon an axle box.

In testimony that I claim the foregoing as my own, I have hereto affixed my signature in the presence of two witnesses.

JAMES NELSON RICKARDS.

Witnesses:
WILLIAM T. TEMPLE,
JAS. H. SMITH.